(12) United States Patent
Millington

(10) Patent No.: US 6,484,089 B1
(45) Date of Patent: Nov. 19, 2002

(54) NAVIGATION SYSTEM WITH ROAD CONDITION SAMPLING

(75) Inventor: Jeffrey Alan Millington, Rochester Hills, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/418,749

(22) Filed: Oct. 15, 1999

(51) Int. Cl.[7] .............................................. G01C 21/30
(52) U.S. Cl. ........................... 701/208; 701/25; 701/28; 701/80; 701/207; 701/220; 340/438; 342/357.01; 342/357.08; 342/357.13
(58) Field of Search ............................ 701/25, 28, 29, 701/35, 80, 200, 207, 208, 213, 214, 216, 217, 220, 221; 73/178 R; 340/438, 988, 995; 342/357.01, 357.02, 357.06, 357.08, 357.09, 357.13; 455/456

(56) References Cited

U.S. PATENT DOCUMENTS

| | | | |
|---|---|---|---|
| 5,719,771 A | 2/1998 | Buck et al. ................. 701/213 |
| 5,790,243 A | 8/1998 | Herr ............................ 356/5.1 |
| 5,852,243 A | * 12/1998 | Chang et al. ................. 73/659 |
| 5,982,325 A | * 11/1999 | Thornton et al. ......... 342/357.07 |
| 6,029,111 A | * 2/2000 | Croyle ......................... 701/207 |
| 6,223,118 B1 | * 4/2002 | Kobayashi et al. ........... 701/96 |

\* cited by examiner

Primary Examiner—Gertrude Arthur
(74) Attorney, Agent, or Firm—Carlson, Gaskey & Olds

(57) ABSTRACT

A vehicle navigation system includes a map database and at least one inertial sensor. When the vehicle encounters a problem road condition, such as a pothole, the problem road condition induces acceleration in the inertial sensor. The navigation system identifies the occurrence of a problem road condition by monitoring the signals generated by the inertial sensor. The navigation system then stores the occurrence and location of the problem road condition. This data can be used later to identify, locate and repair problem road conditions.

22 Claims, 1 Drawing Sheet

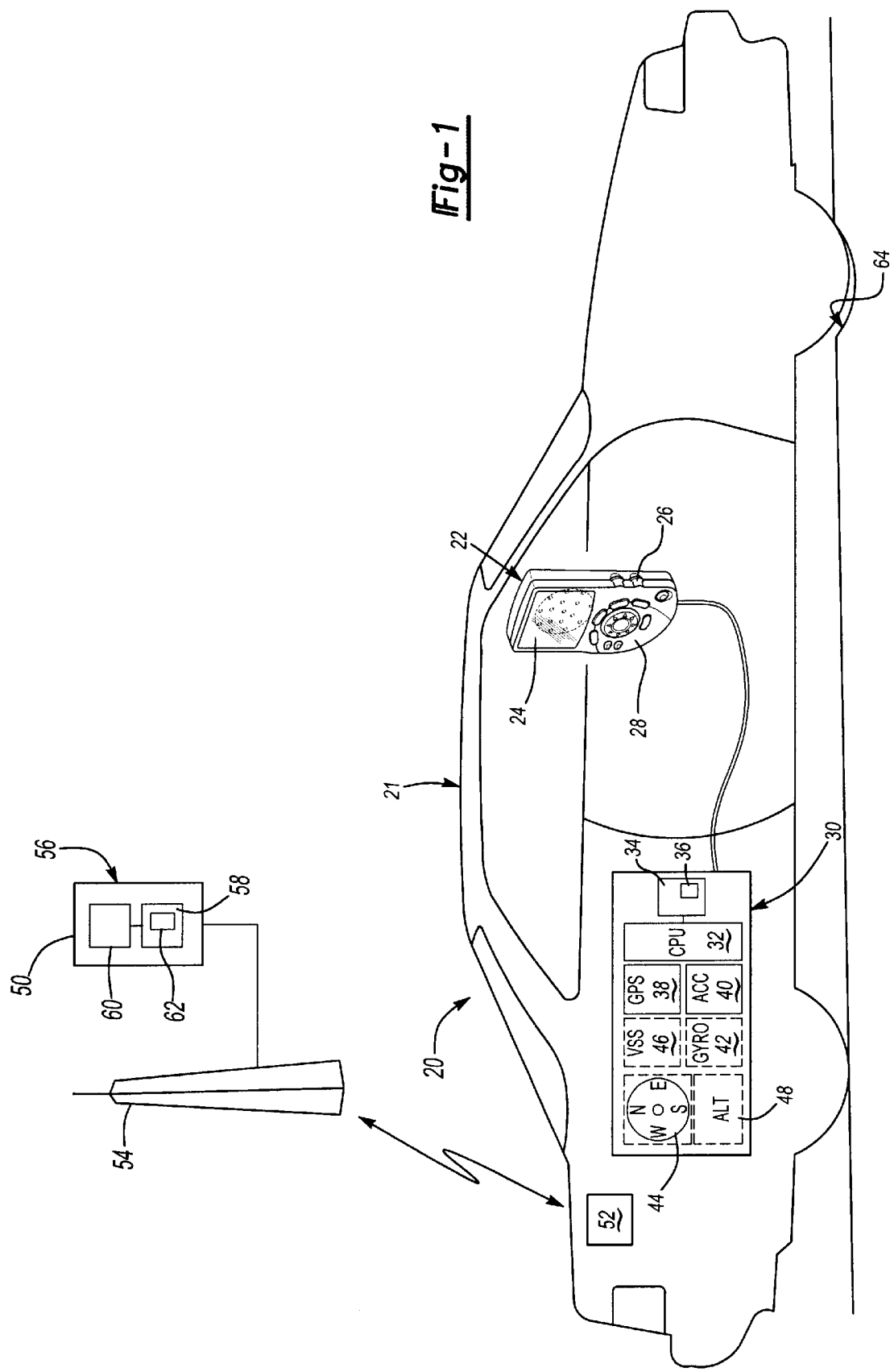

NAVIGATION SYSTEM WITH ROAD CONDITION SAMPLING

BACKGROUND OF THE INVENTION

The present invention relates generally to vehicle navigation systems and more particularly to a vehicle navigation system which also determines the condition of roads on which the vehicle navigation system travels.

Maintaining roads in a large metropolitan area can be difficult. In particular, with large road networks, assessing and locating problem areas can be time consuming. Even potholes which are large enough to require immediate attention must first be identified and located. Motorists who report problem road conditions are generally unable to give accurate descriptions of the location of the problem.

SUMMARY OF THE INVENTION

The present invention takes advantage of the fact that vehicle navigation systems already include the hardware necessary for mapping problem road conditions traveled by the vehicle navigation system. The vehicle navigation system of the present invention includes at least one inertial sensor, such as an accelerometer, which is used both for propagating the position of the vehicle relative to a map database and for determining the condition of the road.

Poor road conditions, such as a pothole, induce motion signals in the inertial sensors which are normally filtered out for purposes of propagating the position of the vehicle; however, by identifying these signals, the occurrence of a problem road condition can be identified. When a problem road condition is identified, the vehicle navigation system notes the current road, current position of the vehicle, vehicle speed, date/time and associates this data with the identified road condition. Subsequent problem road conditions are stored similarly.

Later, the stored database of problem road conditions can be downloaded and analyzed to determine the location of problem road conditions relative to the map database. Road repair personnel can travel straight to the problem road condition locations based upon the data stored by the vehicle navigation system.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic of the navigation system of the present invention installed in a vehicle.

DETAILED DESCRIPTION OF A PREFERRED EMBODIMENT

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

Preferably, the navigation system 20 further includes wireless communication transceiver 52, such as a cellular telephone, PCS, satellite phone, etc. that communicates with a complementary transceiver 54. Information is relayed between the vehicle navigation system 20 and a central station 56 via the transceivers 52, 54. The central station 56 includes a computer 58 including a display 60 and CPU 62.

Generally, the position and motion determining devices determine the position of the vehicle 21 relative to the database 36 of roads utilizing dead reckoning, map-matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

The navigation system 20 propagates the position of the vehicle 21 relative to the map database 36, i.e. relative positions on road segments and intersections ("nodes"). The navigation system 20 also determines the current location of the vehicle 21 in terms of latitude and longitude. Utilizing any of a variety of known techniques, the position of the vehicle 21 relative to the map database 36 and/or in terms of latitude and longitude is determined at least in part based upon the motion signals from the multi-axis accelerometer 40. The current local time and date can be determined from the GPS signals received by the GPS receiver 38.

Generally, the multi-axis accelerometer 40 generates at least two, and preferably three, motion signals, each indicating acceleration along one orthogonal axis of the vehicle 21. By integrating the measured acceleration from each axis over time, the speed and position of the vehicle 21 can be determined. Generally, the motion signals from accelerometer 40 are used in combination with other sensors, such as GPS receiver 38, utilizing known techniques.

When the vehicle 21 travels over a problem road condition 64, such as a pothole or rough road, sharp acceleration signals are induced in the accelerometer 40. These high frequency signals are normally ignored and filtered out by a low pass filter for purposes of propagating position of the vehicle 21. In the present invention, these signals are utilized to identify the problem road condition 64. The signal from the multi-axis accelerometer 40 comprises three signals, one along each orthogonal axis of the vehicle 21, the longitudinal axis of the vehicle 21, the lateral axis of the vehicle 21, and the vertical axis of the vehicle 21. The CPU 32 analyzes the motion signals from the accelerometer 40 to determine the occurrence of the problem road condition 64. The CPU 32 compares the motion signal from the vertical and longitudinal axes of the vehicle 21 to predetermined thresholds to determine the occurrence of the problem road condition 64. Alternatively, the CPU 32 compares the profile of the motion signals (primarily from the vertical and longitudinal axes) to a known profile of a problem road condition 64. In other words, the CPU 32 analyzes the magnitude and/or shape of the signals to determine the occurrence of the problem road condition 64. Thresholds and/or profiles of the signals can be determined experimentally, i.e. by driving a vehicle over different known problem road conditions and using the signals to create profiles and/or thresholds.

When the CPU 32 detects the problem road condition 64, the CPU 32 stores the magnitude and/or shape of the motion signals, preferably in the storage device 34. The CPU 32 also stores and associates with the road condition the vehicle speed at the time the road condition 64 was encountered by the vehicle 21, the date and time that the vehicle 21 encountered the road condition 64, the latitude and longitude of the road condition 64 and the road segment on which the problem road condition 64 exists. Subsequent problem road conditions encountered by vehicle 21 are treated similarly.

All of this information is stored in the storage device 34 and can be subsequently retrieved and analyzed to assist in repairing the problem road conditions 64. Ideally, the navigation system 20 can be installed in each of a plurality of vehicles 21 in a fleet, such as a rental fleet of vehicles 21. Since each of the rental vehicles 21 regularly returns to the central station 56, monitoring and mapping of problem road condition 64 is facilitated. Alternatively, the information generated when the vehicle 21 encounters a problem road condition 64 can be transmitted via the wireless transceiver 52 to the central station 56.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle navigation system comprising:
   at least one inertial sensor generating a motion signal;
   a map database including a network of roads; and
   a processor analyzing the motion signal to determine a position of the vehicle navigation system, the processor analyzing the motion signal to determine a condition of a current road at the position of the vehicle navigation system.

2. The vehicle navigation system of claim 1, wherein the processor further stores the condition and associates the condition with the position of the navigation system.

3. The vehicle navigation system of claim 1, wherein the at least one inertial sensor includes at least one accelerometer.

4. The vehicle navigation system of claim 3, wherein the processor determines the current speed of the navigation system and stores the current speed and associates the stored current speed with the condition.

5. The vehicle navigation system of claim 4, wherein the processor determines the date of the condition and stores and associates the date with the condition.

6. The vehicle navigation system of claim 5, wherein the processor determines the latitude and longitude of the position of the navigation system and stores and associates the latitude and longitude of the position of the navigation system with the condition.

7. The vehicle navigation system of claim 1, wherein the inertial sensor is a multiple axis accelerometer.

8. The vehicle navigation system of claim 7, wherein the processor determines acceleration along a plurality of axes to determine the condition.

9. The vehicle navigation system of claim 8, wherein the processor analyzes a shape of motion signal to determine the condition.

10. The vehicle navigation system of claim 9, wherein the processor compares the shape of the motion signal with a previously stored shape.

11. The vehicle navigation system of claim 1, further including an input device for selecting a destination from the map database, the processor determining a route to the destination via the map database.

12. The vehicle navigation system of claim 1, further including a wireless transmitter transmitting the position and condition via a wireless signal.

13. A method for determining a condition of roads including the steps of:
    (a) driving on a road;
    (b) determining a current position on the road during said step (a) utilizing a processor analyzing a motion signal from an inertial sensor;
    (c) determining a condition of the road during step (a) at the current position by utilizing the processor to analyze the motion signal from the inertial sensor;
    (d) associating the condition determined in step (c) with the position determined in step (b).

14. The method of claim 13 further including the step of storing the position and condition.

15. The method of claim 14, wherein said step (c) is performed by measuring acceleration.

16. The method of claim 15, wherein said inertial sensor is used for the step of measuring acceleration and for determining the position in said step (b).

17. The method of claim 16 wherein said inertial sensor is an accelerometer.

18. The method of claim 17, wherein said steps (b) and (c) are performed by a vehicle navigation system.

19. The method of claim 13 further including the step of:
    determining latitude and longitude in said step b; and
    associating the latitude and longitude with the condition determined in said step (c).

20. The method of claim 13, further including the steps of:
    determining a current date; and
    associating the current date with the condition.

21. The method of claim 13, further including the steps of:
    determining current speed at the time the condition is determined in said step (c); and
    associating the vehicle speed with the condition.

22. The method of claim 13, further including the steps of:
    transmitting the condition via a wireless signal.

* * * * *